March 27, 1956 — A. M. ANDREWS — 2,739,842
COUPLER AND SPRINKLER
Filed Dec. 21, 1953 — 2 Sheets-Sheet 1
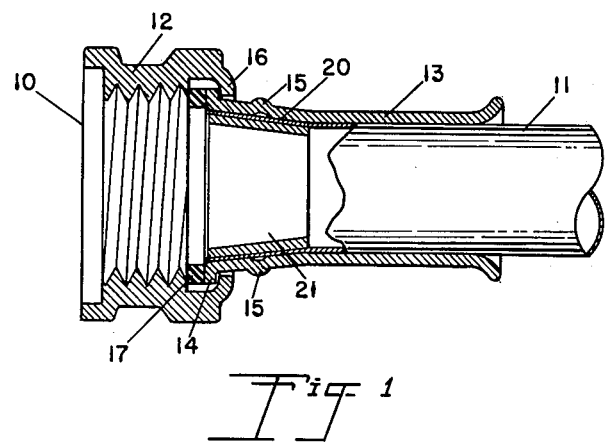
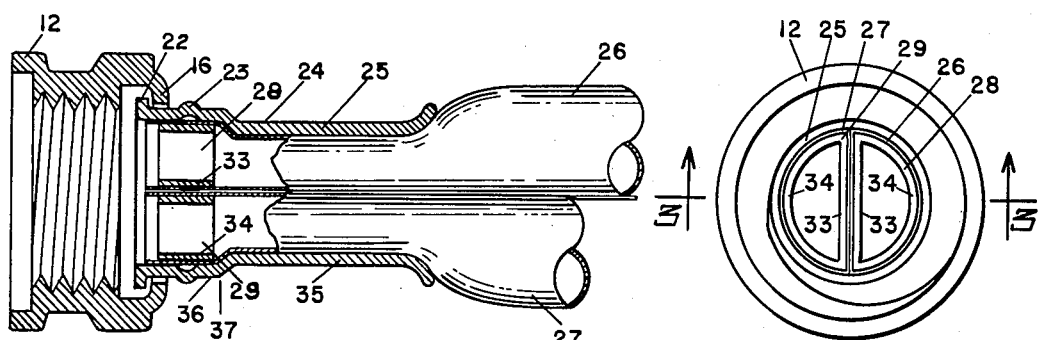
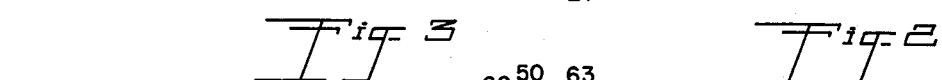
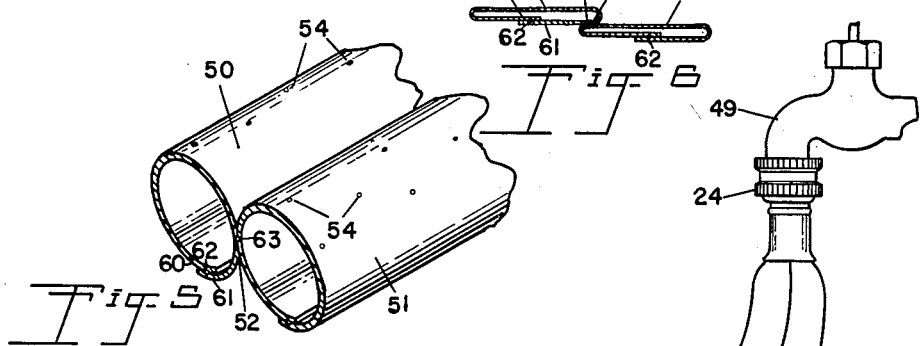
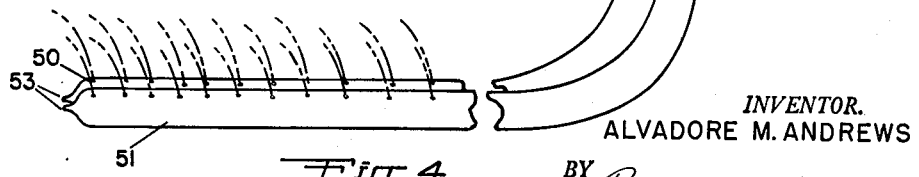
INVENTOR.
ALVADORE M. ANDREWS
BY
ATTORNEYS March 27, 1956     A. M. ANDREWS     2,739,842
COUPLER AND SPRINKLER
Filed Dec. 21, 1953     2 Sheets-Sheet 2
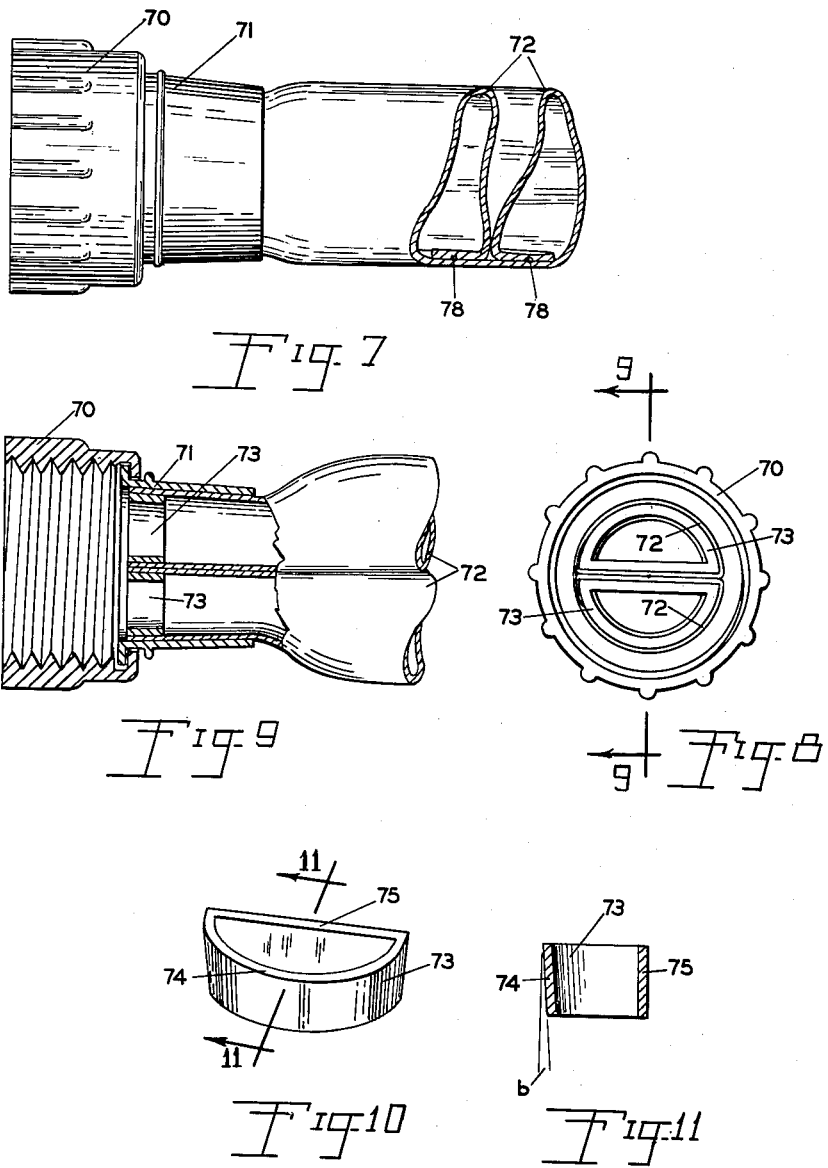
INVENTOR.
ALVADORE M. ANDREWS
BY
ATTORNEYS United States Patent Office 2,739,842
Patented Mar. 27, 1956

2,739,842
COUPLER AND SPRINKLER
Alvadore M. Andrews, Portland, Oreg.
Application December 21, 1953, Serial No. 399,185
15 Claims. (Cl. 299—105)

The present invention relates to fluid distributing apparatus and, more particularly, to new and improved sprinkler hoses and coupler elements in combination therewith.

This application is a continuation-in-part of my copending application Serial No. 292,148, filed June 6, 1952, now abandoned, for improvements in Sprinkler and Coupler Therefor.

The ordinary garden hose formed of multiple layers of rubber fabric, through which lawn sprinkling has heretofore been accomplished, is heavy and bulky and awkward to handle, and is difficult to store conveniently. Furthermore, the sprinkling can be effected only with the use of auxiliary sprinkling attachments adapted for connection to the hose. Moreover, hose of light-weight, flexible material has not been feasible heretofore on account of the lack of suitable couplings for hose of such material.

It is an object of the present invention to provide a new, improved lawn sprinkler that is light in weight, may be easily handled in use, and which will occupy relatively little space when stored.

A further object of the invention is to provide a lawn sprinkler which requires no auxiliary sprinkling attachments.

A more specific object of the invention is to provide a new and improved lawn sprinkler formed of thin, flexible plastic tubing.

Another object of the invention is to provide a new and improved hose and coupler unit which may be simply and inexpensively manufactured.

Still another object of the invention is to provide a coupler for attaching thin, flexible plastic tubes to water faucets and the like.

Other objects and advantages of the invention will become apparent hereinafter.

In accordance with an illustrated embodiment, the present invention comprises a coupler device adapted for attachment to a flexible conduit means defining a plurality of fluid passages. The device is provided with a sleeve for encompassing an end of the conduit means, and spreader elements are provided for holding the passages in ringent condition and for clamping the conduit means within the sleeve.

For a more detailed description of the invention, reference is made to the following specification taken in connection with the accompanying drawings wherein:

Fig. 1 is a cross-sectional view of a coupler for connecting a thin, flexible hose to a faucet;

Fig. 2 is an end view of a coupler for connecting a plurality of thin, flexible tubes to a single faucet;

Fig. 3 is a cross-sectional view along line 3—3 of Fig. 2;

Fig. 4 is a perspective view of a pair of sprinkler tubes connected to a water faucet;

Fig. 5 is a fragmentary perspective view of a pair of thin, plastic sprinkler tubes in their operative condition;

Fig. 6 is an end view of the tubes in Fig. 5 in their collapsed condition;

Fig. 7 is a side elevation of a modified coupler and sprinkling device;

Fig. 8 is an end view of the coupler of Fig. 7;

Fig. 9 is a sectional view taken along line 9—9 of Fig. 8;

Fig. 10 is a perspective view of a spreader element incorporated in the coupler of Fig. 7; and Fig. 11 is a sectional view of the spreader element taken along line 11—11 of Fig. 10.

In Fig. 1 is disclosed a coupler 10 adapted for use with a thin, flexible plastic tube or hose 11 for coupling the same to a water faucet or the like. The coupler 10 includes a headpiece 12 adapted to be threadedly engaged onto a conventional water faucet (not shown) and a sleevelike tubular stem or tailpiece 13 into which the end of the tube 11 is inserted. To prevent disengagement of the stem 13 and the headpiece 12, the stem is provided with an outwardly extending flange 14 on the inner end thereof and an outwardly extending rib 15 spaced therefrom, between which is engaged the inwardly turned flange 16 of the headpiece 12. A fluid tight connection between a water faucet and the stem 13 is effected through an annular rubber washer 17 disposed in the headpiece 12 and adapted to be snugly engaged between the stem flange 14 and the end of the faucet when the headpiece 12 is threaded thereon.

The outer surface of the tube 11 is urged into liquid-tight engagement with the inner surface of the stem 13, whereby water will be directed through the tube, by a sleeve or ring element 21 of slightly smaller diameter than the inner diameter of the stem 13 inserted within the end of tube 11. To effect easier assembly of the tube 11 and coupler 10, the clamping face 20 of the stem 13 is preferably tapered slightly outwardly, for example about 3°, and the ring element 21 is provided with a cooperative taper. The clamping of the tube end within the stem 13, rather than externally thereof, is distinctly advantageous inasmuch as the stem 13 relieves the strain on the tube at the clamping point when it is filled with water so that the tube is less liable to tear. If, for example, the tube were placed about the stem and clamped thereto by some externally concentric ring, the water pressure would force the tube outwardly and the edge of the clamping ring would concentrate the stress on the tube so that it would be more prone to tear at that point.

The views of Figs. 2 and 3 disclose a coupler 24 adapted for connecting a plurality of collapsible, thin plastic tubes or hoses 26, 27, such as of a sprinkler unit to be later described, to a single water faucet. The multiple tube coupler of these views comprises an internally threaded headpiece 12 substantially identical to that described above and a sleeve member or stem 25 extending therefrom, having an annular flange 22 and a rib 23 formed thereon for holding the stem 25 and headpiece 12 in cooperative engagement in like manner to the embodiment of Fig. 1 described above.

The stem 25 is adapted to receive therewithin an end portion of each of the tubes 26, 27, which tubes are engaged in a liquid-tight union in the stem by a clamping ring comprising the arcuate, radially braced D-shaped ring segments or spreading elements 28, 29 adapted to be nested in a ring of slightly lesser diameter than the inner diameter of the portion of the sleeve member into which the segments are inserted. The segments 28, 29 are inserted into the ends of the tubes 26, 27 respectively whereby the portion of a tube adjacent the radial brace 33 of a segment is urged into tight engagement with the adjacent tube and the portion of a tube adjacent the arcuate portion 34 of a segment will be urged tightly against the stem wall. Preferably the stem 25 is provided with an enlarged, cylindrical bell portion 36 within which the clamping ring may be inserted so that the shoulder 37 between the bell portion 36 and the shank portion 35 of the stem will act as a stop to prevent the segments from shifting or sliding through the stem.

While a single tube, such as shown in Fig. 1, may be easily made into a sprinkler by perforating the tube, it is difficult to arrange such a tube on the ground so that the perforated side will remain upwardly, the tube having a tendency to twist and change position when water is supplied thereto. This difficulty is overcome, however, in the sprinkler disclosed in Figs. 4 and 5, the sprinkler in this instance comprising a pair of elongated, thin-walled, flexible plastic tubes or hoses 50, 51 joined together along a narrow, longitudinally extending portion 52 of each and connected at one end to a single water faucet 49 by the coupler 24 shown in detail in Figs. 2 and 3, the opposite ends 53 of the tubes being sealed. Preferably the tubes are of substantially equal diameter whereby, when filled with water and expanded, the tubes will rest upon the ground with their centers and the united portion 52 positioned above the ground a distance substantially equal to the radius of the tubes. Each of the tubes is provided with a plurality of longitudinally spaced-apart openings 54, the openings in one of the tubes being displaced between about 90° and 180° from the united portion of the tube, the perforations in the other tube being displaced within a similar range in a direction opposite to the displacement of the perforations in the first-mentioned tube whereby each of the tubes will be effective to eject water in a direction opposite to the water ejected by the other tube and at right angles to the direction of the tubes. If the tubes are positioned as shown in Fig. 5 with the perforations on the upwardly facing portion of the tubes, the result will be to sprinkle a longitudinally extending strip on either side of the tubes. However, the sprinkler of the invention may be effectively used to soak the ground by reversing its relative position, as shown in Figs. 4 and 5, so that the perforations will be on a downward portion of the sprinkler and the water will escape directly onto the ground without being sprayed into the air.

The view of Fig. 6 is an end view of the sprinkler as shown in Fig. 5, illustrating the collapsed condition thereof. Sprinkler hoses of the type shown and described herein form the subject of my copending application Serial No. 318,065, filed October 31, 1952, and entitled Sprinkling Device.

The tubes of the invention may be made by any suitable method, but are conveniently manufactured by the method of my Patent No. 2,500,053, issued March 7, 1950. In accordance with that method, and referring now to Figs. 5 and 6, each of the tubes is formed by overlapping the end portions 60, 61 of the longer sides of an elongated, rectangular sheet of plastic with a thread 62 impregnated with a bond effecting liquid disposed between the overlapped ends. The overlapping ends are then pressed together to express the solvent from the thread and between the adjacent surfaces of the end portions 60 and 61 and effect a bond therebetween. In like manner a pair of tubes may be joined together by placing a thread 63 impregnated with the bond effecting liquid between a pair of tubes overlapped in the manner of the tubes of Fig. 6 and thereafter applying pressure to the overlapped portions to express the liquid and cause it to bond the tubes one to the other.

A modified coupling device illustrated in Figs. 7 to 11, inclusive, comprises a nut or head piece 70 and sleevelike tubular stem or tail piece 71 extending therefrom. As shown most clearly in Fig. 9, the tail piece 71 is provided with a longitudinally tapered opening, having its largest diameter adjacent to the end of the tail piece coupled to the nut 70, and adapted to receive the end portions of a pair of sprinkling hoses or tubes 72 with the latter extending outwardly of the smaller or outlet end of the tail piece. Preferably the tail piece opening is of a diameter slightly greater than the diameter of the tubes 72. The tubes 72 are clamped within the tail piece 71 by means of a pair of complementary D-shaped ring segments or spreader elements 73 inserted one into each of the tubes 72 and nested to form a clamping ring having a diameter greater than the diameter of the tail piece opening at its smaller end but lesser than the diameter of the tail piece opening at its larger end whereby the segments may be wedged into the tail piece to clamp the portion of a tube 72 adjacent the arcuate portion 74 of a segment snugly against the wall of the tail piece and the portion of a tube adjacent the radial brace 75 of a segment snugly against the other tube. Preferably, the peripheral surface of the arcuate portion 74 of the ring segments 73 is provided with a taper indicated at $b$ in Fig. 11 substantially complementary to the taper of the tail piece opening whereby maximum surface contact will be made between the tubes 72 and the walls of the tail piece 71, to minimize the possibility of leakage therebetween.

This is in fact a preferred embodiment of the invention since the tapering of the opening and ring segments facilitates assembly of the hoses and couplers. Also, should tension be applied to the tubes 72 the ring segments 73 would automatically wedge more tightly in place to prevent the tubes from being pulled out of the tail piece 71.

In this instance the tubes 72 are illustrated as formed from a single sheet of plastic having opposite longitudinal side edges overfolded upon the sheet and then turned under, the turned under portion being sealed to the sheet by a suitable solvent expressed from a solvent impregnated thread 78 placed between each of the edge portions of the sheet and the adjacent surface thereof. Sprinkling openings may be formed in the sheet prior to forming the tubes by the method and apparatus of my copending application Serial No. 316,037, filed October 21, 1952. Such a sprinkler and its manner of manufacture is more completely described in my copending application Serial No. 318,065, filed October 31, 1952. Obviously the coupler 70, 71 is not limited to use with the tubes 72 as illustrated but may be used with hoses fashioned in various other manners.

Sprinkler tubes made in accordance with the present invention are extremely light in weight, may be made very inexpensively, and, of course, do not require auxiliary sprinkling attachments. Furthermore, since the tubes may collapse in the manner shown in Fig. 6, they may be rolled or folded into a small bundle that occupies little space and may be easily stored.

Having illustrated and described preferred embodiments of my invention, it should be apparent to those skilled in the art that the invention permits of modification in arrangement and detail. I claim as my invention all such modifications as come within the true spirit and scope of the appended claims:

1. In combination, a coupler element including a tubular stem, a plurality of thin-walled flexible tubes, each having an end portion extending into said stem, a plurality of sleeve elements inserted one into each of said tube end portions and effecting a fluid-tight engagement between said tubes and the inner surface of said stem.

2. A combination as in claim 1 wherein said tubes are elongated and provided with a plurality of small, longitudinally spaced-apart openings for the emission of water therefrom.

3. In combination, a coupler element including a tubular stem, a plurality of thin-walled flexible tubes, each having an end portion extending into said stem, and a clamping ring for securing said tube end portions within said stem comprising a plurality of radially braced ring segments inserted one into each of said tubes and effecting a fluid-tight engagement between said tubes and the inner surface of said stem.

4. The combination comprising a coupler device including a tubular stem and a pair of flexible walled conduits, each having an end portion disposed within said stem and extending therefrom, and means for clamping said end portions within said stem and effective to retain the end of each of said conduits in expanded condition whereby fluid flowing into the coupler will pass into each of said conduits.

5. The combination comprising a pair of flexible walled tubes having substantially the same diameter and connected together throughout their lengths, and a coupler device for said tubes comprising a tubular stem encompassing said tubes at one end thereof and means for retaining each of said tube ends in ringent condition and for clamping the tubes against the inner wall of said stem in fluid-tight engagement therewith.

6. The combination comprising a pair of flexible walled tubes secured together along their length and perforated along their length to permit escape of liquid therefrom, a coupler for connecting said tubes to a water spout comprising a tubular tail piece encompassing said tubes at one end thereof, and a pair of complementary spreader elements, one in each of said tube ends, for retaining the tubes open and for effecting clamping engagement between the tubes and the inner surface of said tail piece.

7. The combination comprising a conduit device formed of an elongate strip of flexible sheet material having the opposite longitudinal marginal edge portions overfolded upon the same surface of the strip and secured thereto in spaced relation to the longitudinal center line to form a pair of parallel cylindrical fluid passages of substantially the same diameter joined by a web comprising the intermediate portion of the strip, and a coupler device comprising a tubular stem encompassing said conduit device at one end thereof, said stem having an inner diameter slightly greater than the diameter of said passages, said web being folded to bring said passages into engagement with one another, and a pair of D-shaped spreader elements mounted one in each of said passages with the straight portion of said elements relatively adjacent and parallel and with the arcuate portion of said elements facing relatively oppositely one another for clamping against each other the portions of said passage walls between said straight portions and for clamping against the inner wall of said stem the portions of the wall of each of said passages adjacent said arcuate portions.

8. A coupler device for attachment to a flexible conduit means defining a plurality of fluid passages, said coupler device comprising a sleeve member adapted to encompass an end of said conduit means, and a plurality of spreader elements adapted to be inserted one into each of said fluid passages for holding the same in expanded condition and for effecting fluid tight engagement between said conduit means and the inner surface of said sleeve member.

9. A coupler device for a fluid conducting means comprising a plurality of fluid passages defined by flexible wall members, said device comprising a hollow stem adapted to receive therewithin an end of said fluid conducting means, and a plurality of complementary spreader elements adapted to be inserted one into the end of each of said fluid passages for retaining the same open and for effecting fluid tight clamping engagement between said wall members and the inner wall of said stem.

10. A coupler element for connecting a plurality of tubes formed of thin, flexible material to a single fluid conducting member, said element including a stem having a tubular shank portion and an enlarged, cylindrical bell portion at one end thereof adapted to receive the end portions of tubes inserted through the other end thereof, and an annular clamping ring comprising a plurality of complementary, radially braced, arcuate segments adapted to be inserted individually within the end portions of tubes received within said bell portion for forcing said tubes tightly against one another and against the wall of said bell portion to form a fluid tight connection between said tubes and said stem.

11. In a coupling device for use with a plurality of sprinkler hoses formed of a thin, flexible material, an elongated sleeve member adapted to receive the end portions of said hoses therewithin, and a plurality of complementary, arcuate, radially braced segments adapted to be nested together in a ring of slightly lesser diameter than the inner diameter of said sleeve, said segments being adapted to be inserted individually into said hose end portions whereby the portion of a hose adjacent the radial brace of a segment will be urged tightly against the adjacent hose and the portion of a hose adjacent the arcuate portion of a segment will be urged tightly against the sleeve wall to effect a liquid-tight seal between said sleeve and said hoses.

12. A coupler element adapted for connection to a flexible tubular device forming a plurality of fluid passages, said element comprising a tail piece having an opening therethrough and having an inlet and an outlet end, said opening being smaller at said outlet end than at said inlet end, said tail piece being adapted to receive an end of said tubular device with the same extending outwardly of said outlet end, and a plurality of complementary spreader elements adapted to be nested in a formation having a peripheral outline complementary to said tail piece opening but of dimension intermediate those of said inlet and outlet ends, said spreader elements being adapted to be inserted into said passages from the inlet end of the tail piece and positioned in said formation thus to press said device into fluid tight clamping engagement with the inner wall of said tail piece opening.

13. A coupling device for connecting a plurality of flexible walled conduits to a single fluid conducting member, said device comprising an elongate sleeve having a longitudinally tapered opening adapted to receive an end portion of said conduits with the conduits extending outwardly of the smaller end thereof, and a clamping ring for securing said conduits within said sleeve comprising a plurality of complementary ring segments each having an arcuate portion and radial brace means between the ends of said arcuate portion, said ring being of lesser diameter than the diameter of said opening at its largest end but of greater diameter than the diameter of said opening at its smallest end, said segments being adapted for insertion one into each of said conduit end portions and to be arranged in said ring to clamp said conduits within said sleeve.

14. A coupler element for a plurality of thin-walled flexible tubes comprising a tail piece having a tapered passage therethrough adapted to receive an end portion of said tubes and a clamping ring for securing said tubes within said tail piece comprising a plurality of complementary radially braced arcuate ring segments adapted to be positioned one in each of said tubes for forcing said tubes against one another and against the inner wall of said tail piece to effect a fluid tight seal therebetween, the peripheral surface of said ring having a taper complementary to the taper of said passage and having a diameter at its larger end less than the greatest diameter of said tail piece opening, but greater than the least diameter of said tail piece opening.

15. A coupling device for use with a pair of thin walled flexible tubes comprising a sleeve having a longitudinally tapered opening adapted to receive the ends of said tubes therein, and a pair of complementary D-shaped spreading elements adapted to be inserted one into each of said tubes and nested in a ring for clamping the tubes against each other and against the sleeve wall, the arcuate portion of said elements having a taper complementary to the taper of said sleeve opening, the greatest radius of said elements being less than the radius of said sleeve opening at its larger end but greater than the radius of said sleeve opening at its smaller end whereby said elements are adapted to be wedged into said sleeve to effect a fluid tight connection betwen the tubes and said sleeve.

References Cited in the file of this patent

UNITED STATES PATENTS

| Re. 4,605 | Cooke | Oct. 24, 1871 |
| 110,253 | Locher | Dec. 20, 1870 |
| 174,876 | Tyler | Mar. 14, 1876 |
| 176,241 | Price | Apr. 18, 1876 |
| 458,038 | Rice | Aug. 18, 1891 |
| 725,275 | McLean | Apr. 14, 1903 |
| 893,554 | St. Onge | July 14, 1908 |
| 925,483 | Kantz | June 22, 1909 |

FOREIGN PATENTS

| 416 | Great Britain | Jan. 12, 1885 |